US012742702B2

(12) United States Patent
Matohara et al.

(10) Patent No.: US 12,742,702 B2
(45) Date of Patent: Sep. 22, 2026

(54) INTERNAL COMBUSTION ENGINE CONTROL DEVICE

(71) Applicant: Hitachi Astemo, Ltd., Hitachinaka (JP)

(72) Inventors: Shinya Matohara, Hitachinaka (JP); Takeshi Eto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 401 days.

(21) Appl. No.: 18/560,575

(22) PCT Filed: Feb. 1, 2022

(86) PCT No.: PCT/JP2022/003894
§ 371 (c)(1),
(2) Date: Nov. 13, 2023

(87) PCT Pub. No.: WO2023/286300
PCT Pub. Date: Jan. 19, 2023

(65) Prior Publication Data

US 2024/0255381 A1 Aug. 1, 2024

(30) Foreign Application Priority Data

Jul. 12, 2021 (JP) ................................ 2021-115029

(51) Int. Cl.
*G01M 15/04* (2006.01)

(52) U.S. Cl.
CPC ................................ *G01M 15/042* (2013.01)

(58) Field of Classification Search
CPC .. G01M 15/042; F02D 41/18; F02D 2250/12; F02D 2200/0402; F02D 2250/14
See application file for complete search history.

(56) References Cited

U.S. PATENT DOCUMENTS 10,240,545 B2 * 3/2019 Pursifull ............. F02D 41/0002
11,448,150 B2 * 9/2022 Ishikawa ............. F02D 41/0007
12,123,366 B2 * 10/2024 Oryoji .................. F02D 35/026

FOREIGN PATENT DOCUMENTS

JP 2014-109450 A 6/2014
JP 2017-110500 A 6/2017
JP 2018-159369 A 10/2018

OTHER PUBLICATIONS

International Search Report (PCT/ISA/210) issued in PCT Application No. PCT/JP2022/003894 dated Mar. 22, 2022 with English translation (4 pages).

(Continued)

*Primary Examiner* — An H Do
(74) *Attorney, Agent, or Firm* — Crowell & Moring LLP

(57) ABSTRACT

An ECU includes a processing device that repeatedly executes an air amount calculation process for estimating a flow rate of intake air. The processing device acquires a detection value of a flow rate sensor and stores the detection value in a storage device, stores a time when the detection value of the flow rate sensor is acquired in the storage device as a first time stamp, and stores a time when the air amount calculation process is executed in the storage device as a second time stamp. In the air amount calculation process of the processing device, an execution interval of a calculation process at a current time point is calculated based on the second time stamp, an integration period having the same time width as the execution interval of the calculation process at the current time point is set based on the second time stamp, an integrated mass of the intake air in the integration period is calculated based on a detection value of the flow rate sensor and the first time stamp, and the flow rate of the intake air in the integration period is estimated using the integrated mass of the calculation result and the execution interval.

3 Claims, 7 Drawing Sheets

(56) References Cited

OTHER PUBLICATIONS

Japanese-language Written Opinion (PCT/ISA/237) issued in PCT Application No. PCT/JP2022/003894 dated Mar. 22, 2022 with English translation (5 pages).

* cited by examiner

FIG. 2

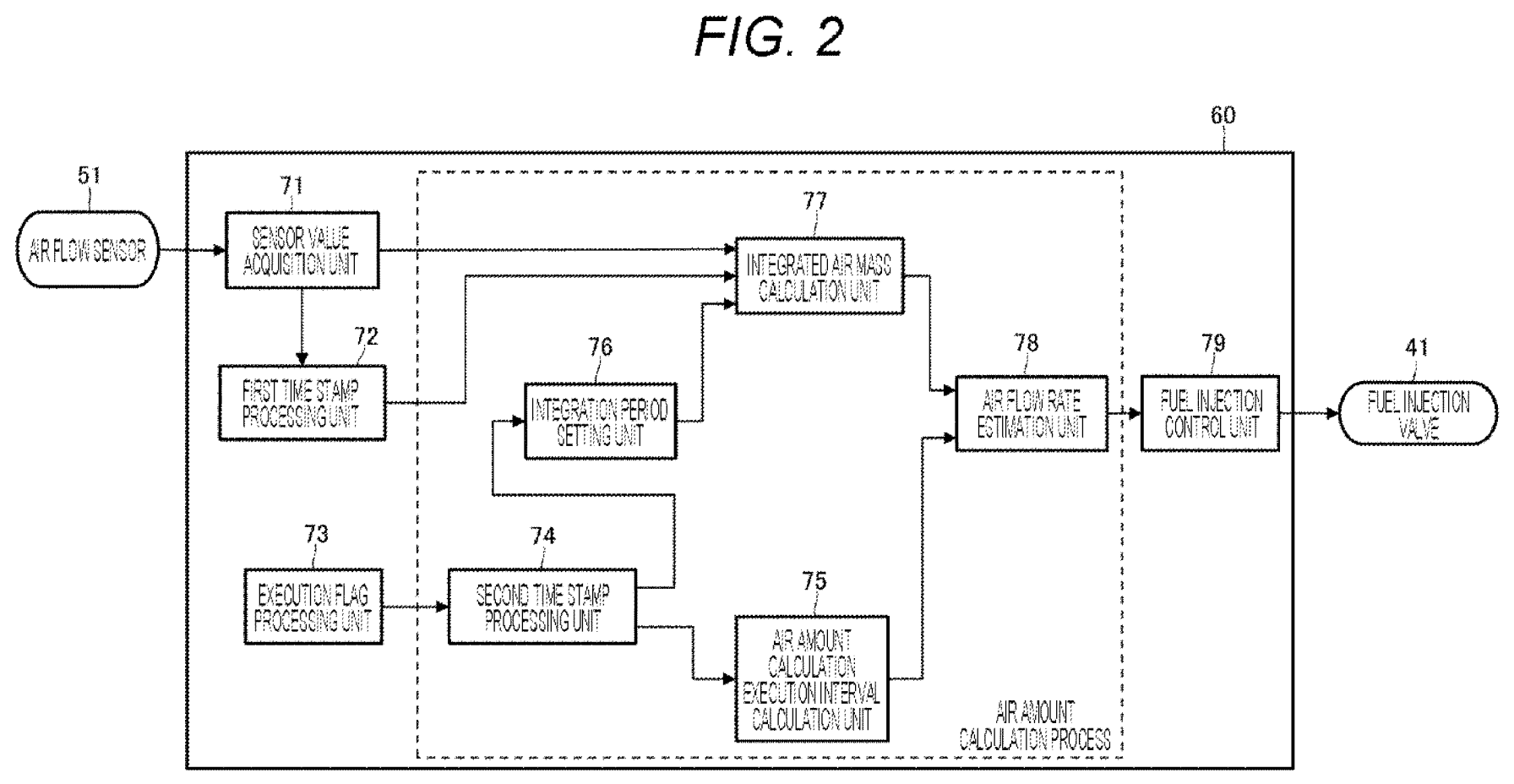

51 AIR FLOW SENSOR

60

71 SENSOR VALUE ACQUISITION UNIT

72 FIRST TIME STAMP PROCESSING UNIT

73 EXECUTION FLAG PROCESSING UNIT

74 SECOND TIME STAMP PROCESSING UNIT

75 AIR AMOUNT CALCULATION EXECUTION INTERVAL CALCULATION UNIT

76 INTEGRATION PERIOD SETTING UNIT

77 INTEGRATED AIR MASS CALCULATION UNIT

78 AIR FLOW RATE ESTIMATION UNIT

79 FUEL INJECTION CONTROL UNIT

41 FUEL INJECTION VALVE

AIR AMOUNT CALCULATION PROCESS

TIME [ms]
EXECUTION INTERVAL OF AIR AMOUNT CALCULATION PROCESS [ms]
0
10
20
30
40
50
0
0.5
1
1.5
2
2.5
3

CURRENT EXECUTION INTERVAL OF AIR AMOUNT CALCULATION PROCESS
CURRENT INTEGRATION PERIOD
MASS FLOW RATE OF INTAKE AIR [g/s]
SENSOR VALUE
Q1a
Q3s
Q1b
Q1c
Q3e
Q1d
SENSOR VALUE
S1
S2
S3
T1a
T3s
T1b
T2p-1
T1c
T3e
T1d
T2p
T1e
TIME [sec]
PREVIOUS TIMER COUNT (EXECUTION TIME POINT OF AIR AMOUNT CALCULATION PROCESS)
CURRENT TIMER COUNT (EXECUTION TIME POINT OF AIR AMOUNT CALCULATION PROCESS)

INTERNAL COMBUSTION ENGINE CONTROL DEVICE

TECHNICAL FIELD

The present invention relates to an internal combustion engine control device that controls an internal combustion engine, and more particularly, to an internal combustion engine control device that controls fuel injection of an internal combustion engine based on a detection signal of a flow rate sensor that detects an intake air amount of the internal combustion engine.

BACKGROUND ART

In recent years, in automobiles and the like using an internal combustion engine as a prime mover, regulations on fuel consumption and exhaust have been strengthened, and these regulations tend to be stricter in the future. Since a flow rate (hereinafter, it may be referred to as an intake air amount) of air taken into the internal combustion engine is a parameter used when the internal combustion engine control device (hereinafter, it may be referred to as an engine control unit (ECU)) calculates a fuel injection amount of the internal combustion engine, it is important to estimate the intake air amount that changes from moment to moment with high accuracy in order to cope with future regulations.

A typical example of the sensor that detects the intake air amount is an air flow sensor. As a type of the air flow sensor, for example, there is a hot wire type sensor having a heating resistor. As the detection signal of the air flow sensor of this type, a voltage signal that changes a voltage value based on a signal from the heating resistor that changes according to an intake air amount or a frequency signal that changes a period of an output pulse is often used. There is known an air flow sensor equipped with a sensor that detects pressure, humidity, and the like. In such an air flow sensor, single edge nibble transmission (SENT) communication is increasingly adopted. In the SENT communication, detection values of a plurality of types of sensors are transmitted using one signal line. A transmission cycle of the SENT communication is managed substantially constantly inside the air flow sensor. The SENT communication is one-way communication from the air flow sensor to the ECU, and the sensor value is transmitted in a phase different from a calculation cycle of the ECU.

As a technique for calculating an intake air amount of an internal combustion engine, for example, a technique described in PTL 1 is known. In an internal combustion engine control device described in PTL 1, an intake air amount (integrated mass of the intake air) in a predetermined integration period having the same time width corresponding to a predetermined calculation cycle longer than an acquisition cycle of a sensor value of an air flow sensor is calculated based on a sensor value actually measured by the air flow sensor and an acquisition time of the sensor value.

CITATION LIST

Patent Literature

PTL 1: JP 2018-159369 A

SUMMARY OF INVENTION

Technical Problem

In the internal combustion engine control device described in PTL 1, the time width of the calculation cycle of the intake air amount is set to a predetermined value (for example, 2 ms) longer than the acquisition cycle (for example, 0.95 ms) of the sensor value of the air flow sensor, and the above-described integration period has the same time width as the calculation cycle of the intake air amount. The internal combustion engine control device divides the intake air amount (integrated mass of intake air) in the integration period of the calculation result by a predetermined time width (predetermined time width same as the calculation cycle) of the integration period to finally convert the intake air amount into an average intake air flow rate (mass flow rate) per unit time, and uses the converted result for the calculation of the fuel injection amount. However, the calculation cycle (time width) of the intake air amount may fluctuate under the influence of a relationship with other calculation processes, an interruption calculation process, and the like.

However, in PTL 1, there is no description regarding the influence on the calculation result when the time width of the calculation cycle of the intake air amount fluctuates. However, when the integrated mass of the intake air in the integration period is converted into the average intake air flow rate (mass flow rate) per unit time, the influence when the time width of the calculation cycle of the intake air amount is not a predetermined value but fluctuates occurs. That is, the calculation result of the average intake air flow rate changes due to the fluctuation of the time width of the calculation cycle of the intake air amount. As a result, the fuel injection amount calculated using the average intake air flow rate is also affected, and there is a concern that the exhaust performance is deteriorated.

The present invention has been made to solve the above problems, and an object of the present invention is to provide an internal combustion engine control device capable of estimating an intake air amount with high accuracy even when an execution interval of a calculation process of the intake air amount of an internal combustion engine fluctuates.

Solution to Problem

The present application includes a plurality of means for solving the above problems. As an example, there is provided an internal combustion engine control device including: a processing device that repeatedly executes an air amount calculation process of estimating a flow rate of intake air based on a detection value of a flow rate sensor that detects a flow rate of the intake air of an internal combustion engine at time intervals; and a storage device that stores information necessary for the air amount calculation process of the processing device, in which the processing device is configured to acquire a detection value of the flow rate sensor at a predetermined acquisition cycle shorter than an execution interval of the air amount calculation process and stores the detection value in the storage device, store a time when the detection value of the flow rate sensor is acquired in the storage device as a first time stamp in association with the detection value of the flow rate sensor, and store a time at which the air amount calculation process is executed each time in the storage device as a second time stamp, and in each time of the air amount calculation process of the processing device, an execution interval calculation of calculating an execution interval of a calculation process at a current time point is performed based on the second time stamp stored in the storage device, an integration period having the same time width as the execution interval of the calculation process at the current time point is set based on the second time stamp stored in the storage device, an integration calculation of calculating an integrated mass of the intake air in the set integration period is performed based on the detection value of the flow rate sensor stored in the storage device and a first time stamp corresponding to the detection value, and an estimation flow rate calculation of estimating the flow rate of the intake air in the set integration period is performed based on a calculation result of the integration calculation and a calculation result of the execution interval calculation.

Advantageous Effects of Invention

According to the present invention, the execution interval of each time of the air amount calculation process is calculated based on the second time stamp stored in the storage device, and the flow rate of the intake air is estimated using the execution interval of the calculation result. Therefore, even when the execution interval of the air amount calculation process fluctuates instead of a constant cycle, the influence of the fluctuation of the execution interval of the air amount calculation process on the estimated flow rate of the calculation result can be eliminated. That is, even when the execution interval of the air amount calculation process of the processing device fluctuates, the intake air amount can be estimated with high accuracy.

Problems, configurations, and effects other than the above will be clarified by the following description of embodiments.

BRIEF DESCRIPTION OF DRAWINGS

FIG. 2 is a block diagram illustrating functions of the internal combustion engine control device according to one embodiment of the present invention illustrated in FIG. 1.

DESCRIPTION OF EMBODIMENTS

Hereinafter, an embodiment of an internal combustion engine control device of the present invention will be described with reference to the drawings. In the present embodiment, a reciprocating engine will be described as an example of a control target of the internal combustion engine control device.

Figure 1:
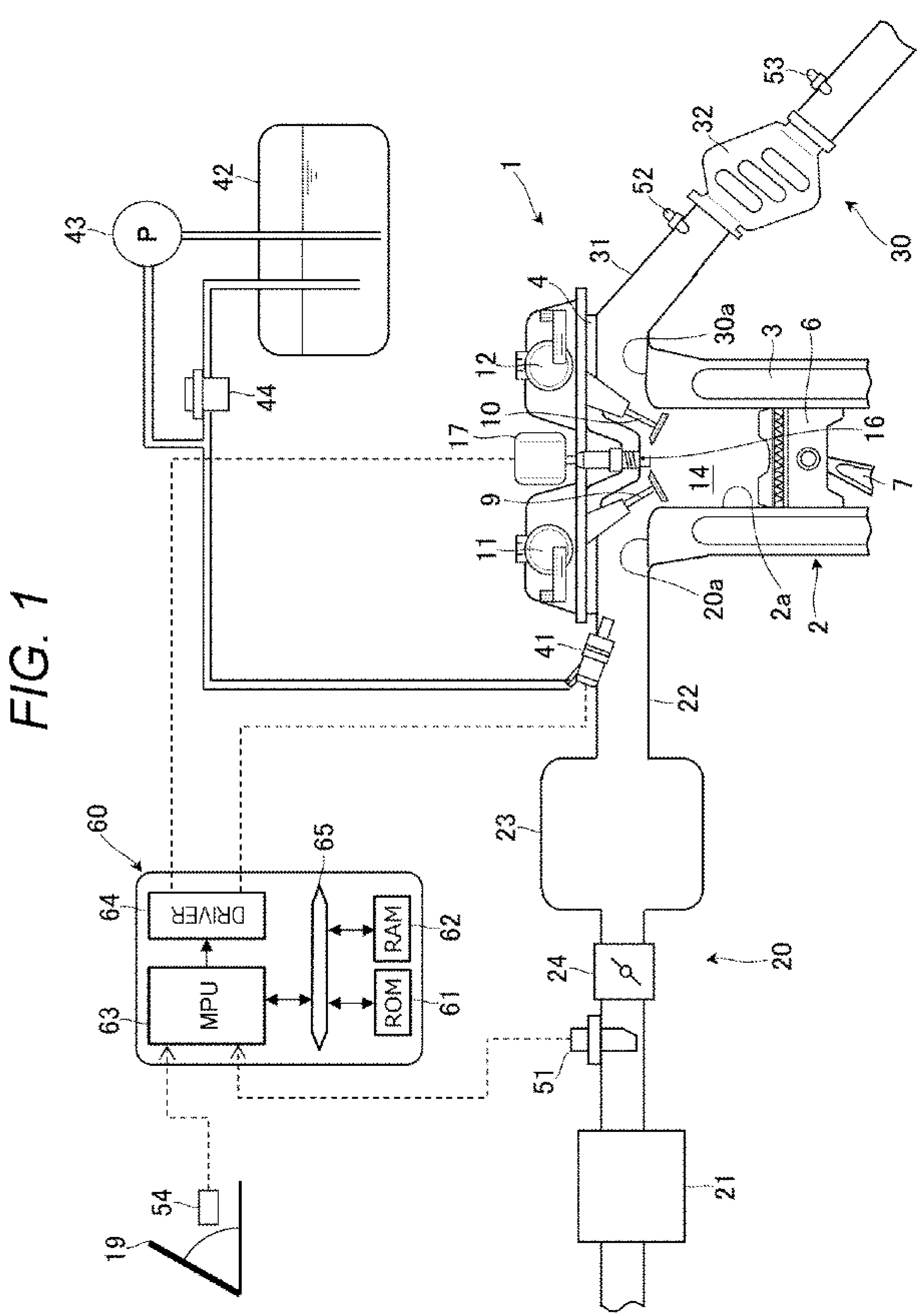
FIG. 1 is a schematic configuration diagram illustrating an internal combustion engine system including an internal combustion engine control device according to one embodiment of the present invention.

First, a schematic configuration of an internal combustion engine system including an internal combustion engine control device according to one embodiment of the present invention will be described with reference to FIG. 1. FIG. 1 is a schematic configuration diagram illustrating an internal combustion engine system including an internal combustion engine control device according to one embodiment of the present invention.

In FIG. 1, the internal combustion engine system includes an internal combustion engine 1 (hereinafter, the engine may be referred to as an engine.) and an engine control unit (ECU) 60 as an internal combustion engine control device that controls the internal combustion engine 1. The engine 1 is, for example, a spark ignition type reciprocating engine mounted on an automobile as a prime mover. The engine 1 includes an engine body 2 having a cylinder block 3 and a cylinder head 4. A plurality of (only one is shown in FIG. 1.) cylinders 2*a* (cylinders) are formed in the engine body 2. A piston 6 is slidably inserted into each cylinder 2*a*. The piston 6 is connected to a crankshaft (not shown) via a connecting rod 7. The crankshaft converts reciprocating motion of the piston 6 into rotational motion. An intake valve 9 and an exhaust valve 10 are disposed in the cylinder head 4. The intake valve 9 and the exhaust valve 10 are driven to open and close by an intake camshaft 11 and an exhaust camshaft 12, respectively.

The cylinder block 3, the cylinder head 4, the piston 6, the intake valve 9, and the exhaust valve 10 form a combustion chamber 14. In the cylinder head 4, an ignition plug 16 is disposed corresponding to the combustion chamber 14 of each cylinder 2*a*. The ignition plug 16 is electrically connected to an ignition coil 17, and an ignition signal having a high voltage is supplied from the ignition coil 17.

An intake passage 20 is communicably connected to the combustion chamber 14 on the intake valve 9 side of the engine body 2. The intake passage 20 includes an air cleaner 21 and an intake manifold 22 having a collector 23, and has an intake port 20*a* at a downstream end portion. The air cleaner 21 filters air sucked into the engine 1. The intake manifold 22 is connected to each cylinder 2*a* of the engine body 2, and diverts the sucked air from the collector 23 to each cylinder 2*a*. A throttle valve 24 capable of adjusting a flow rate of the intake air is disposed upstream of the collector 23 in the intake passage 20.

An exhaust passage 30 is connected to the exhaust valve 10 side of the engine body 2. The exhaust passage 30 includes an exhaust manifold 31 and has an exhaust port 30*a* at an upstream end portion. A three-way catalyst 32 is disposed on the downstream side of the exhaust manifold 31 in the exhaust passage 30. The three-way catalyst 32 is a catalyst for exhaust gas purification in which platinum, palladium, or the like is applied to a carrier such as alumina or ceria, and performs an exhaust purification treatment for purifying the exhaust gas.

In the intake manifold 22 of the intake passage 20, a fuel injection valve 41 is provided corresponding to each cylinder 2*a*. The fuel injection valve 41 is installed so as to inject a fuel toward the intake port 20*a* of the intake passage 20. The fuel injection valve 41 is driven to open in response to a control signal (fuel injection signal) from the ECU 60. The fuel is supplied to the fuel injection valve 41 by a fuel supply mechanism. The fuel supply mechanism includes a fuel tank 42 that stores the fuel, a fuel pump 43 that sends the fuel in the fuel tank 42 to the fuel injection valve 41, and a fuel regulator 44 that adjusts the pressure of the fuel supplied to the fuel injection valve 41. The fuel injection valve 41 may be an in-cylinder direct injection type valve that directly injects the fuel into the cylinder 2*a*.

An air flow sensor 51 as an example of a flow rate sensor that detects the flow rate of the intake air is installed on the downstream side of the air cleaner 21 and the upstream side of the throttle valve 24 in the intake passage 20. The air flow sensor 51 includes, for example, a hot wire (heating resistor) disposed in the intake passage 20. In the air flow sensor 51, a bridge circuit is formed such that the value of the current flowing through the hot wire increases as the flow rate of the intake air increases, and the value of the current flowing through the hot wire decreases as the flow rate decreases. The air flow sensor 51 extracts a value of a heating resistance current flowing through the hot wire (a value corresponding to the flow rate of the intake air) as a voltage signal, and outputs a sensor value (for example, a voltage, a frequency signal, or data of SENT communication) to the ECU 60. When performing SENT communication, the air flow sensor 51 transmits a sensor value corresponding to the flow rate of the intake air to the ECU 60 every predetermined transmission cycle. The transmission cycle is, for example, 1 ms in accordance with the SAE standard (SAE-J2716).

An air-fuel ratio sensor 52 is installed on the upstream side of the three-way catalyst 32 in the exhaust passage 30. The air-fuel ratio sensor 52 has, for example, a linear output characteristic with respect to the air-fuel ratio of the exhaust gas flowing upstream of the three-way catalyst 32. An $O_2$ sensor 53 is installed on the downstream side of the three-way catalyst 32 in the exhaust passage 30. For example, the $O_2$ sensor 53 outputs, to the ECU 60, a switching signal for identifying whether the air-fuel ratio of the exhaust gas flowing downstream of the three-way catalyst 32 is richer or leaner than a stoichiometric air-fuel ratio (theoretical air-fuel ratio).

The internal combustion engine system includes an accelerator opening degree sensor 54 that detects an accelerator opening degree by an accelerator pedal 19. The accelerator opening degree sensor 54 outputs an accelerator opening degree signal corresponding to the detected accelerator opening degree to the ECU 60.

The ECU 60 is an electronic control unit that performs overall control of the engine 1 based on various types of information. The ECU 60 executes, for example, a process (air-fuel ratio control process) of controlling the fuel injection amount injected from the fuel injection valve 41, a process of controlling the ignition timing by the ignition plug 16, and the like based on the accelerator opening degree signal from the accelerator opening degree sensor 54, and the like. The ECU 60 according to the present embodiment executes a calculation process of the intake air amount based on the sensor value (intake air flow rate) from the air flow sensor 51. The ECU 60 includes a microcomputer including a read only memory (ROM) 61 and a random access memory (RAM) 62 as storage devices, a micro processor unit (MPU) 63 as a processing device, a driver 64, and the like. The ROM 61 and the RAM 62 are connected to the MPU 63 via a bus 65. In addition, the ECU 60 has a built-in timer function, and constantly counts.

The ROM 61 stores various programs for controlling the engine 1. The MPU 63 executes various types of calculation processes according to a program read from the ROM 61. The RAM 62 temporarily stores various types of information (data) necessary for calculation process of the MPU 63. The driver 64 generates various control signals such as a fuel injection instruction signal for instructing the fuel injection amount and an ignition timing instruction signal for instructing the ignition timing according to the calculation result of the MPU 63, and outputs the generated control signal to various devices such as the fuel injection valve 41 and the ignition coil 17. The MPU 63 of the ECU 60 according to the present embodiment repeatedly executes an air amount calculation process of estimating the flow rate of the intake air of the engine 1 based on the sensor value of the air flow sensor 51 at time intervals according to the program stored in the ROM 61, and controls the fuel injection amount according to the calculation result (estimated flow rate of the intake air) of the air amount calculation process.

In the internal combustion engine system having the above-described configuration, the air (intake air) taken in from the intake port (not illustrated) passes through the air cleaner 21, the flow rate of the air is adjusted by the throttle valve 24, and the air flows into the collector 23 of the intake manifold 22. The intake air flowing into the collector 23 flows toward the intake port 20*a* corresponding to each cylinder 2*a* via each branch pipe of the intake manifold 22.

The fuel stored in the fuel tank 42 is adjusted to a predetermined pressure by the fuel pump 43 and the fuel regulator 44 and supplied to the fuel injection valve 41. The fuel supplied to the fuel injection valve 41 is injected into the intake port 20*a* corresponding to each cylinder 2*a* by opening the fuel injection valve 41 according to a control signal from the ECU 60.

The intake air in the intake port 20*a* that has passed through the intake passage 20 and the fuel injected into the intake port 20*a* from the fuel injection valve 41 are mixed to generate the air-fuel mixture. The air-fuel mixture is sucked into the combustion chamber 14 in each cylinder 2*a* in accordance with the opening of the intake valve 9. The air-fuel mixture in the combustion chamber 14 is compressed by the piston 6 and combusted by spark ignition of the ignition plug 16 generated by application of a high voltage of the ignition coil 17 according to a control signal from the ECU 60. A crankshaft (not illustrated) is rotationally driven via the piston 6 by combustion of the air-fuel mixture.

The exhaust gas generated by the combustion is exhausted from the combustion chamber 14 to the exhaust manifold 31 via the exhaust port 30*a* of the exhaust passage 30 according to the opening of the exhaust valve 10, and is guided to the three-way catalyst 32 to be purified. The exhaust gas that has passed through the three-way catalyst 32 is finally released to the atmosphere through the exhaust passage 30.

Next, a functional configuration of an ECU according to one embodiment of the present invention will be described with reference to FIGS. 2 to 6. FIG. 2 is a block diagram illustrating functions of the internal combustion engine control device according to one embodiment of the present invention illustrated in FIG. 1.

In FIG. 2, the ECU 60 includes functional units of a sensor value acquisition unit 71, a first time stamp processing unit 72, an execution flag processing unit 73, a second time stamp processing unit 74, an air amount calculation execution interval calculation unit 75, an integration period setting unit 76, an integrated air mass calculation unit 77, an air flow rate estimation unit 78, and a fuel injection control unit 79 as processing functions of an MPU 63 (see FIG. 1) that estimates the flow rate of air (intake air) taken into the combustion chamber 14 of the engine 1 based on a detection value (sensor value) of the air flow sensor 51 and controls the fuel injection amount of the fuel injection valve 41 based on the estimated flow rate of the intake air as a calculation result. In the ECU 60 of the present embodiment, a series of processes up to the functional unit 74 to 78 of the functional units 71 to 79 corresponds to the air amount calculation process of estimating the flow rate of the intake air based on the detection value (sensor value) of the air flow sensor 51. A part of the calculation process of the fuel injection control unit 79 corresponds to the calculation process (air-fuel ratio control process) of the fuel injection amount. The ignition timing calculation process will not be described here.

The sensor value acquisition unit 71 acquires a detection signal corresponding to the intake air amount (flow rate of intake air) detected by the air flow sensor 51. When the air flow sensor 51 transmits the detection signal at a constant cycle (for example, 1 ms) by SENT communication, the sensor value acquisition unit 71 receives the detection signal of the air flow sensor 51 at a constant cycle (constant time interval).

The first time stamp processing unit 72 stores the count of the timer function when the sensor value acquisition unit 71 receives the detection signal of the air flow sensor 51 in the storage device (the ROM 61 or the RAM 62) as a first time stamp. The first time stamp is stored in association with, for example, the received detection value (sensor value) of the air flow sensor 51.

The execution flag processing unit 73 raises an execution flag indicating execution of the air amount calculation process described above according to an execution command of the calculation process. In addition to the air amount calculation process, the ECU 60 executes various calculation processes such as the fuel injection amount calculation process and the ignition timing calculation process by allocating them to various calculation JOBs. Execution commands for the various calculation JOBs are managed by a timer function of the ECU 60, and the various calculation JOBs are executed at a constant cycle according to the execution commands. In the ECU 60 of the present embodiment, for example, the air amount calculation process is allocated to 2 ms JOB. In addition to the air amount calculation process, for example, a plurality of different processes such as process A and process B are allocated to 2 ms JOB. The execution order of the plurality of processes allocated to 2 ms JOB is predetermined. For example, consider a case where the process A is executed first, the process B is executed next, and the air amount calculation process is executed next. The execution command for a 2 ms JOB is output at a constant cycle (time interval) of 2 ms. When the execution of 2 ms JOB is instructed, the execution of the air amount calculation process is started after the execution of the process A and the process B is completed. As a result, the execution flag processing unit 73 sets the execution flag indicating the execution of the air amount calculation process and delivers the execution flag to the second time stamp processing unit 74.

When receiving the execution flag that has risen due to the execution of the air amount calculation process, the second time stamp processing unit 74 stores a count $T2_p$ of the timer function at the time of receiving the execution flag in the storage device (ROM 61 or RAM 62) as the second time stamp. That is, the second time stamp processing unit 74 stores a time of an execution time point of each time of the air amount calculation process as the second time stamp every time. When storing the second time stamp at the current execution time point (this time) of the air amount calculation process, the second time stamp processing unit 74 also maintains, in the storage device (ROM 61 or RAM 62), at least information of a second time stamp $T2_{p-1}$ indicating a time of the previous execution time point stored in the previous air amount calculation process. That is, the second time stamp processing unit 74 holds both the second time stamp $T2_{p-1}$ of the previous air amount calculation process and the second time stamp $T2_p$ of the current air amount calculation process in the storage device (ROM 61 or RAM 62).

The air amount calculation execution interval calculation unit 75 calculates an execution interval (time width) $\Delta T_I$ of each time of the air amount calculation process. Specifically, the current second time stamp $T2_p$ and the previous second time stamp $T2_{p-1}$ are called from the storage device (ROM 61 or RAM 62), and a difference obtained by subtracting the previous second time stamp $T2_{p-1}$ from the current second time stamp $T2_p$ is calculated. The air amount calculation execution interval calculation unit 75 passes the execution interval (time width) $\Delta T_I$ of the current air amount calculation process of the calculation result to the air flow rate estimation unit 78.

In order to improve the accuracy of a calculation result to be described later of the air flow rate estimation unit 78, the accurate execution interval (time width) of each time of the air amount calculation process is required. The air amount calculation process is allocated to 2 ms JOB, but the execution interval of the process is not necessarily constant 2 ms. Rather, since the process is less performed at a constant time interval of 2 ms, it is necessary to calculate the execution interval (time width) of the air amount calculation process every time.

Figure 3:
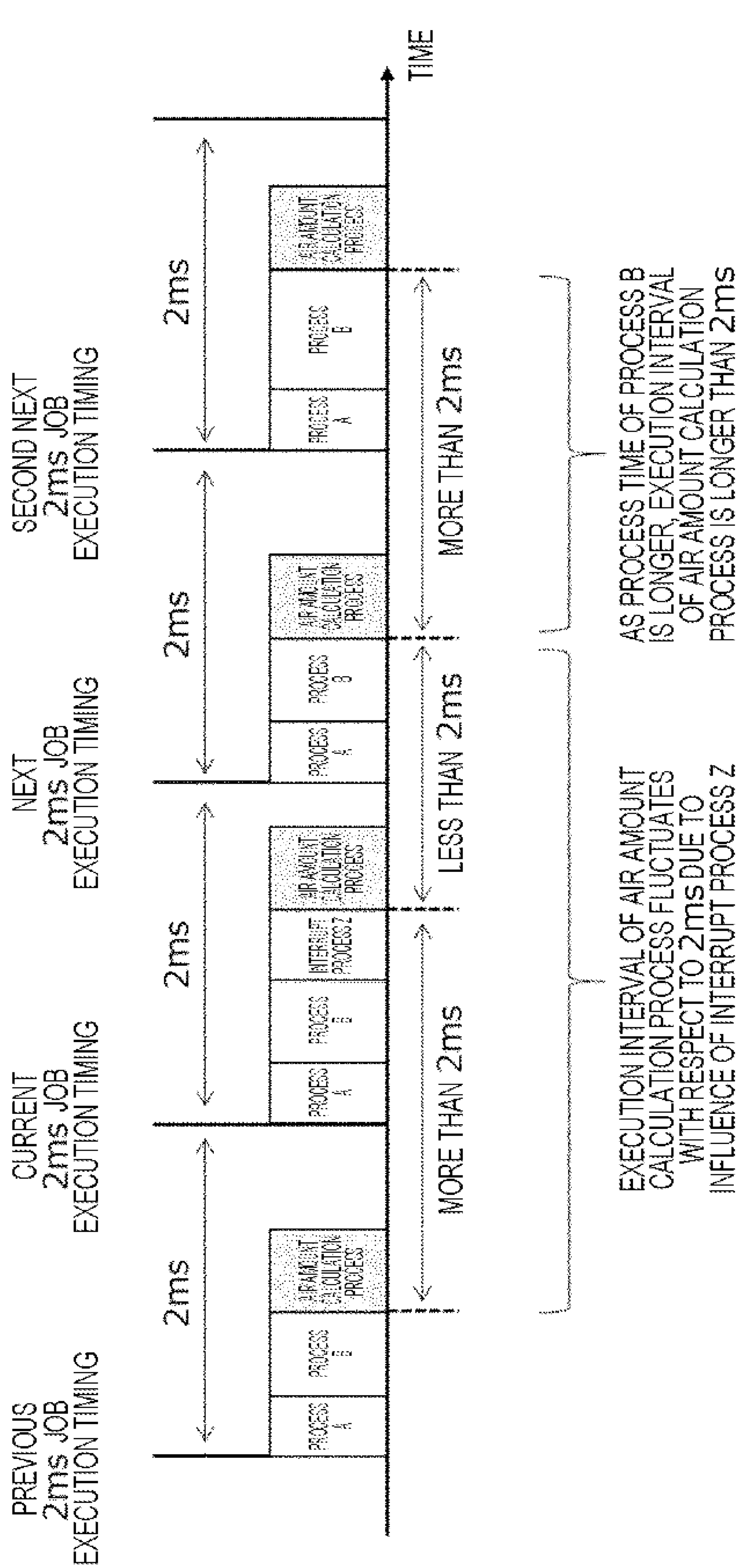
FIG. 3 is an explanatory diagram illustrating a reason why an execution interval of each time of an air amount calculation process in the internal combustion engine control device according to the embodiment of the present invention illustrated in FIG. 2 fluctuates.

FIG. 3 is an explanatory diagram illustrating the reason why the execution interval of the air amount calculation process in the internal combustion engine control device according to one embodiment of the present invention illustrated in FIG. 2 fluctuates. The 2 ms JOB to which the air amount calculation process is allocated is executed at a constant cycle of 2 ms by the timer function of the ECU 60. A plurality of processes is allocated to 2 ms JOB. The execution order of 2 ms JOB is, for example, the process A, the process B, and air amount calculation process. When the process A and the process B end each time with the same process time and the air amount calculation process is executed immediately thereafter, the execution interval of the air amount calculation process is 2 ms. However, an interrupt process Z having a high processing priority may be executed in the middle of 2 ms JOB. In this case, the time interval from the execution time point of the previous air amount calculation process to the execution time point of the current air amount calculation process becomes longer by the process time of the interrupt process Z and exceeds 2 ms. In a case where there is no interrupt process Z in the next executed 2 ms JOB, the execution time point of the previous air amount calculation process is shifted backward as compared with the case where there is no interrupt process Z, so that the time interval until the next execution of the air amount calculation process is shortened accordingly and becomes less than 2 ms. In addition, the process time of the process A and the process B does not always have the same time width every time. Even when the interrupt process Z is not started in the second next 2 ms JOB, for example, when the process time of the process B becomes longer, the time interval (execution interval) of the air amount calculation process fluctuates and becomes longer than 2 ms.

Figure 4:
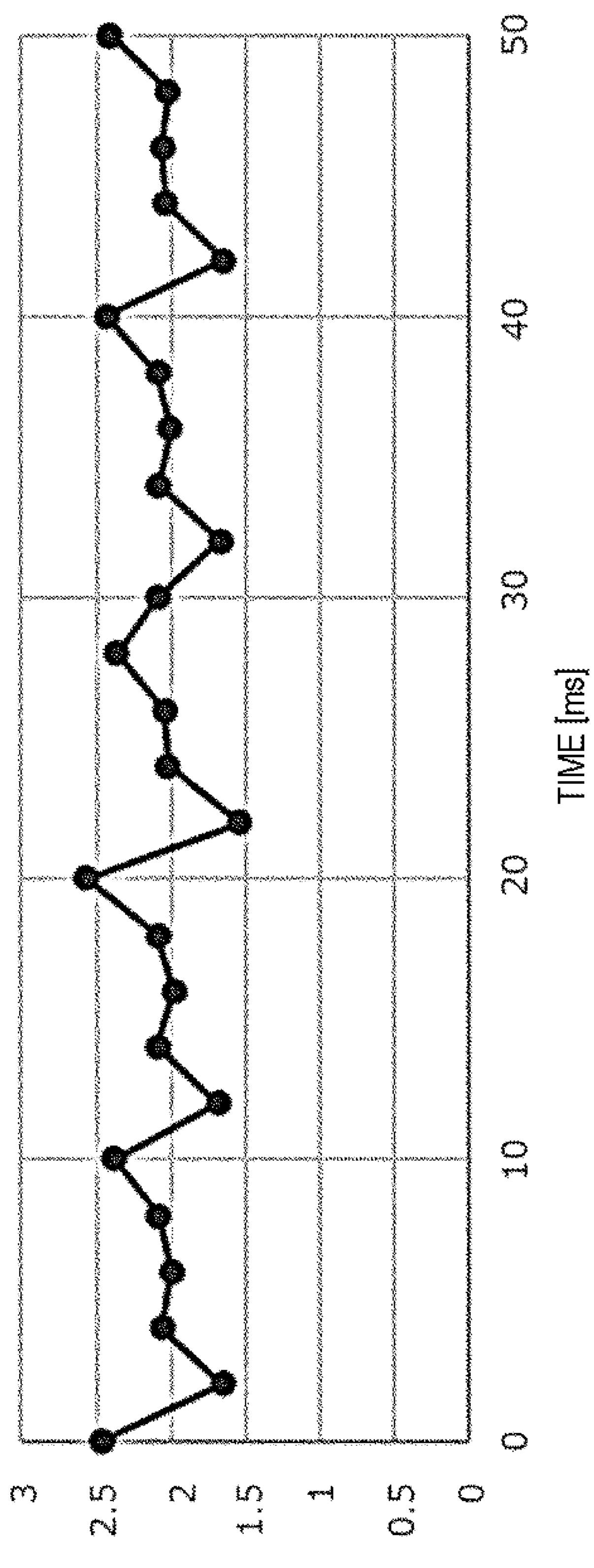
FIG. 4 is a diagram illustrating an example of fluctuation in the execution interval of the air amount calculation process in the internal combustion engine control device according to the embodiment of the present invention illustrated in FIG. 2.

FIG. 4 is a diagram illustrating an example of fluctuation in the execution interval of the air amount calculation process in the internal combustion engine control device according to one embodiment of the present invention illustrated in FIG. 2. When the time of each process allocated to 2 ms JOB is always constant and no interrupt process is performed, the execution interval (time width) of the air amount calculation process is 2 ms as in the JOB cycle of 2 ms JOB. However, as described above, since the time of each process fluctuates or the interrupt process enters, the execution interval (time width) of the air amount calculation process fluctuates in a range of about +0.5 ms around 2 ms as illustrated in FIG. 4. In addition, when the execution interval of the air amount calculation process at a certain time becomes long to about 2.5 ms, the next execution interval conversely becomes short to about 1.5 ms. From this, it can be seen that the phenomenon described with reference to FIG. 3 has occurred.

As described above, the execution interval (time width) of the air amount calculation process of the ECU 60 may fluctuate. Therefore, the air amount calculation execution interval calculation unit 75 of the ECU 60 according to the present embodiment calculates the execution interval (time width) $\Delta T_f$ of each time of the air amount calculation process for each calculation process.

The integration period setting unit 76 sets an integration period in an integration calculation to be described later of the integrated air mass calculation unit 77. Specifically, the integration period (integration section) of each time of the integration calculation to be described later of the integrated air mass calculation unit 77 is set to have the same time width as the execution interval of each time of the air amount calculation process. This is to prevent an overlapping period and a leakage period from occurring in the integration period in the repeatedly executed air amount calculation process. However, the integration period (integration section) is set to be shifted from the execution time point of the air amount calculation process to the past time by an offset amount Tx. That is, a start time point T3s of the current integration period is a time calculated by subtracting the offset amount Tx from the second time stamp $T2_{p-1}$ indicating the time of the execution time point of the previous air amount calculation process. In addition, an end time point T3e of the current integration period is a time calculated by subtracting the offset amount Tx from the second time stamp $T2_p$ indicating the execution time point of the current air amount calculation process. That is, the start time point T3s and the end time point T3e of the current integration period are calculated from the following Expressions (1) and (2), respectively.

$$T3s = T2_{p-1} - Tx \quad \text{Expression (1)}$$

$$T3e = T2_p - Tx \quad \text{Expression (2)}$$

Such a method of setting the integration period is for the following reason.

Since the air amount calculation process is allocated to 2 ms JOB, an execution interval (time width) of the calculation process is about 2 ms. However, the above-described fluctuation occurs in the execution interval of the air amount calculation process. Meanwhile, since the sensor value of the air flow sensor 51 is transmitted by SENT communication, a transmission cycle of the sensor value is constant, for example, 1 ms. Therefore, for example, the ECU 60 basically receives the sensor value of the air flow sensor 51 twice during the execution time point of each time of the air amount calculation process.

However, the transmission cycle of the sensor value of the air flow sensor 51 is different from the execution interval (cycle) of the air amount calculation process of the ECU 60, and the reception time point of the sensor value from the air flow sensor 51 and the execution time point of the air amount calculation process are shifted. That is, the sensor value of the air flow sensor 51 at the execution time point of the air amount calculation process is unknown. Therefore, when the current execution time point of the air amount calculation process is set to the end time point of the integration period, the flow rate of the intake air at the end time point of the integration period cannot be interpolated using the sensor value (flow rate of the intake air) of the air flow sensor 51.

Therefore, as described above, by shifting the start time point T3s and the end time point T3e of the integration period in the current calculation process from the execution time point of the air amount calculation process to the past time by the offset amount Tx, the flow rate of the intake air at the end time point T3e of the integration period can be interpolated using the sensor value (flow rate of the intake air) of the air flow sensor 51. The integration period setting unit 76 stores the start time point T3s and the end time point T3e of the integration period at the current calculation time of the air amount calculation process in the storage device (ROM 61 or RAM 62) as a third time stamp.

Figure 5:
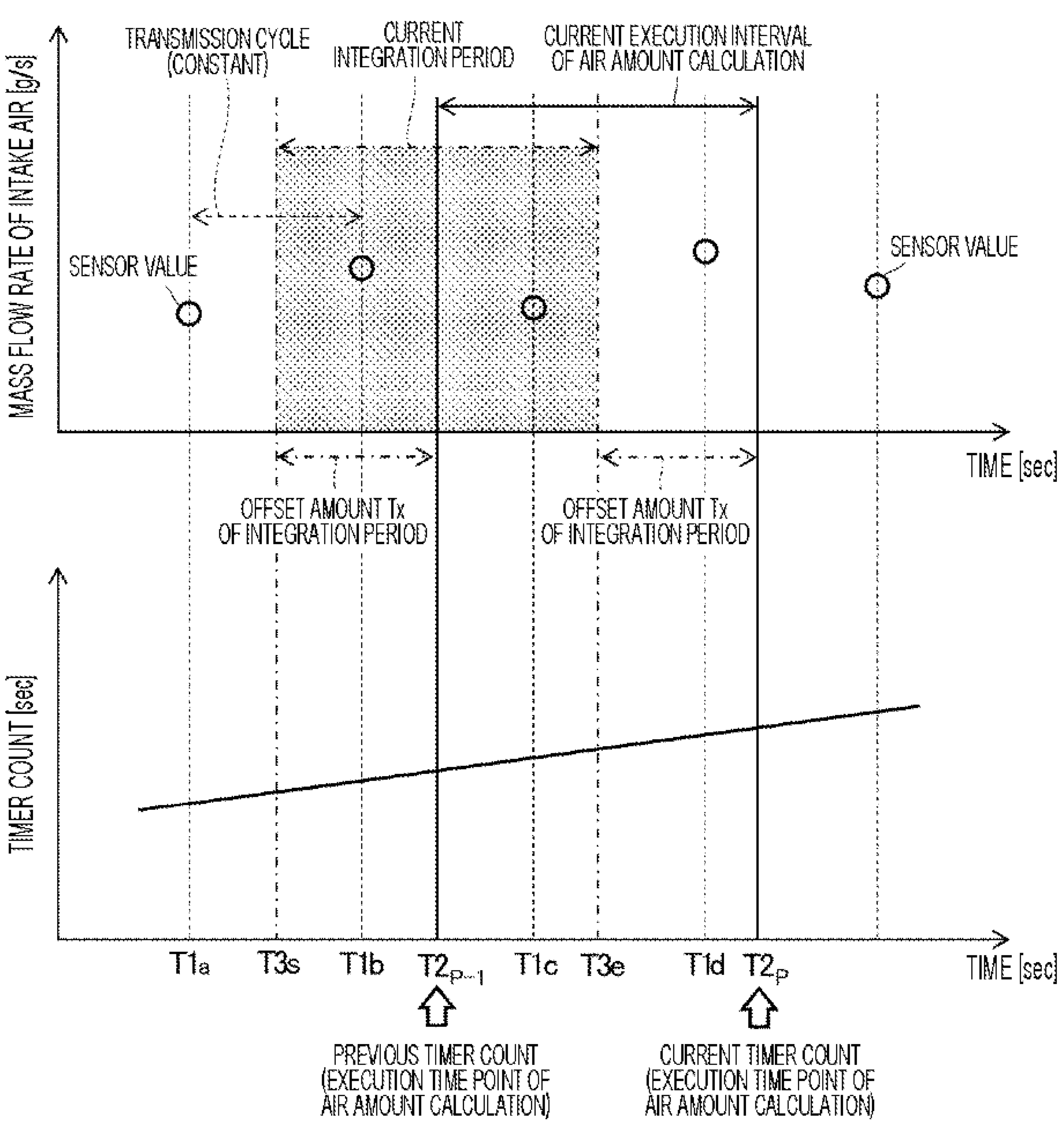
FIG. 5 is an explanatory diagram illustrating a mutual relationship among an execution interval of a calculation process in the air amount calculation process of the internal combustion engine control device according to the embodiment of the present invention illustrated in FIG. 2, an integration period set in the calculation process, and a transmission cycle of a sensor together with a timer count (passage of time).

FIG. 5 is an explanatory diagram illustrating a mutual relationship among the execution interval of the calculation process in the air amount calculation process of the internal combustion engine control device according to the embodiment of the present invention illustrated in FIG. 2, the integration period set in the calculation process, and the transmission cycle of the sensor together with a timer count (passage of time). A vertical axis in the lower diagram of FIG. 5 indicates the count of the timer function, and the count gradually increases as time passes.

In FIG. 5, the sensor value of the air flow sensor 51 is indicated by a circle, and is received by the ECU 60 every 1 ms which is the transmission cycle of the SENT communication. Therefore, the counts T1a, T1b, T1c, and T1d of the timer functions indicating the time at the time of reception by the ECU 60 are stored in the storage device (ROM 61 or RAM 62) as first time stamps.

In addition, the count of the timer function indicating the time of the execution time point of the current air amount calculation process is $T2_p$, the count of the timer function indicating the time of the execution time point of the previous air amount calculation process is $T2_{p-1}$, and the count $T2_{p-1}$ and the count $T2_p$ are stored in the storage device (ROM 61 or RAM 62) as second stamps. In this case, the time interval (time width) from the count $T2_{p-1}$ to the count $T2_p$ is the execution interval of the current air amount calculation process.

In addition, the count T3s previously shifted from the count $T2_{p-1}$ by the offset amount Tx and the count T3e previously shifted from the count $T2_p$ by the offset amount Tx are stored in the storage device (ROM 61 or RAM 62) as third stamps. In this case, the time interval (time width) from the count T3s to the count T3e is the integration period of the integration calculation in the current air amount calculation process. That is, the time interval (time width) obtained by previously shifting the execution interval (time width) of the current air amount calculation process from the count $T2_{p-1}$ to the count $T2_p$ by the offset amount Tx is the integration period of the current integration calculation. The integration calculation described later by the integrated air mass calculation unit 77 uses the sensor value detected in the integration period.

Therefore, it is necessary to set the offset amount Tx so that the sensor value of the air flow sensor 51 can be reliably received in the time interval (period of the offset amount Tx) from the count T3e, which is the end time point of the current integration period, to the count $T2_p$, which is the execution time point of the current air amount calculation process. This is because, if there is no sensor value within this period, the flow rate of the intake air at the end time point of the integration period cannot be estimated by the sensor value (actual measurement value). For this reason, the offset amount Tx needs to be set to 1 ms or more which is the transmission cycle of the SENT communication. However, when the offset amount Tx is set relatively long, the past result is reflected accordingly, and the delay of the calculation result with respect to the actual physical phenomenon becomes large. Therefore, it is desirable to set the offset amount Tx to a value close to 1 ms of the transmission cycle of the sensor value. In FIG. 5, the sensor value is received at the time of the count T1b and the count T1c within the current integration period. In addition, the sensor value is received at the time of the count T1d within the time interval from the count T3e to the count T2p.

The integrated air mass calculation unit 77 performs the integrated mass of the intake air in the integration period set by the integration period setting unit 76 based on the sensor value of the air flow sensor 51 and the information of the first stamp. For example, the integrated air mass calculation unit 77 estimates the flow rate of the intake air at the start time point and the end time point of the integration period using the sensor value (the flow rate of the intake air) detected during the integration period and the sensor values detected before and after the integration period, and calculates an area during the integration period using the estimated values at the start time point and the end time point of the integration period and the sensor value during the integration period. Specifically, it is as follows.

Figure 6:
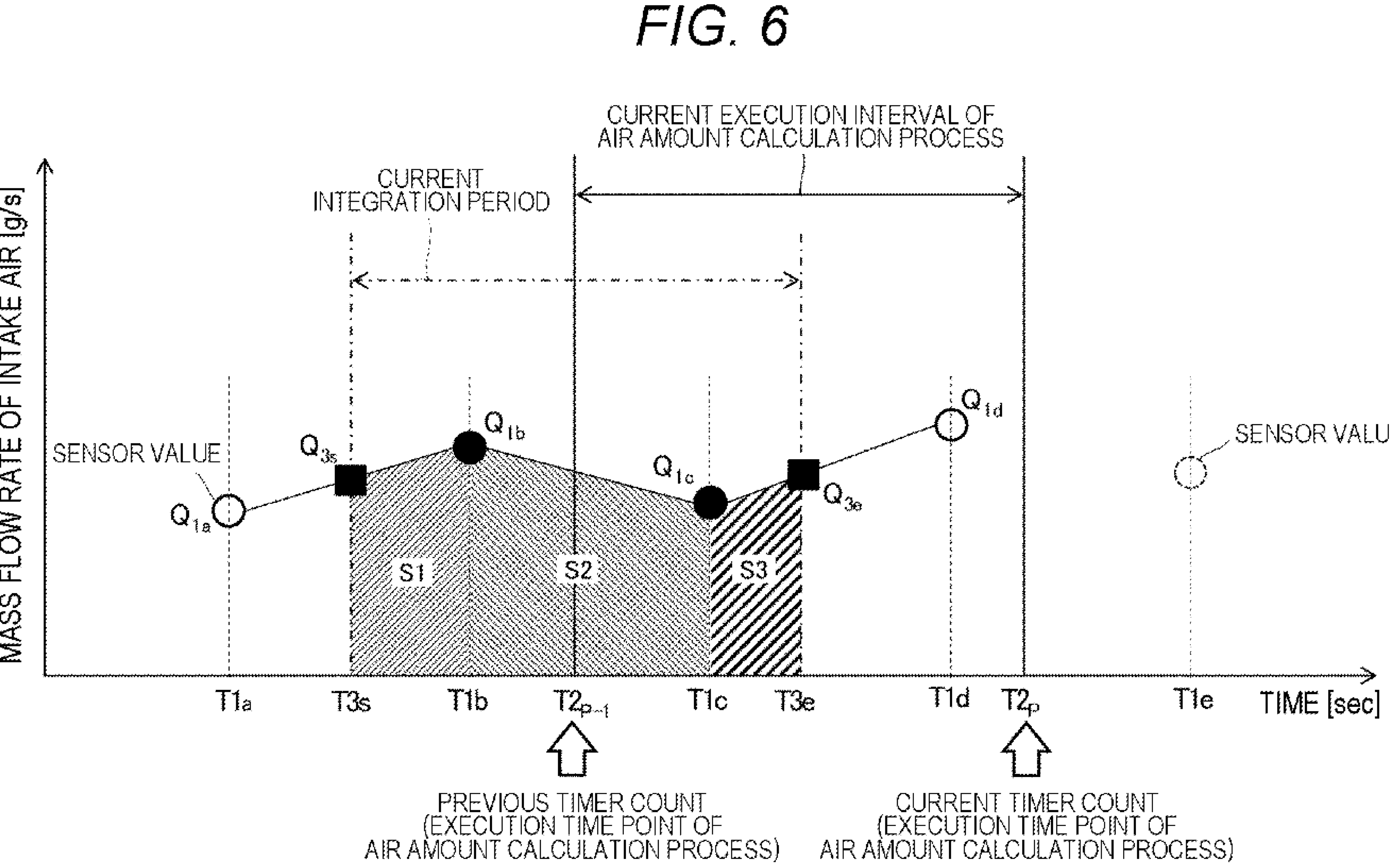
FIG. 6 is an explanatory diagram illustrating an example of a method of calculating an integrated mass of intake air in an integrated air mass calculation unit of the internal combustion engine control device according to one embodiment of the present invention illustrated in FIG. 2.

FIG. 6 is an explanatory diagram illustrating an example of a method of calculating the integrated mass of the intake air in the integrated air mass calculation unit of the internal combustion engine control device according to the embodiment of the present invention illustrated in FIG. 2. In FIG. 6, a vertical axis represents the sensor value (the flow rate g/s of the intake air) of the air flow sensor 51, and a horizontal axis represents the count (time s) of the timer function representing the elapsed time.

The flow rate of the intake air in the integration period is linearly interpolated using the sensor value (the flow rate of the intake air) detected during the integration period and the sensor values detected before and after the integration period. The area defined by linear interpolation within the integration period in FIG. 6 is obtained by estimating the integrated mass of the air taken in during the integration period. Therefore, an area S1, an area S2, and an area S3 illustrated in FIG. 6 are calculated, and the total value of the three areas is set as the integrated mass Si of the intake air in the integration period.

In FIG. 6, timer counts when each sensor value is received are indicated by T1a to T1d. Each sensor value is indicated as Q1a to Q1d in correspondence with the timer count of each sensor value. In such notation, an interpolation value Q3s at the start time point T3s of the integration period is estimated from the sensor value Q1a detected in the timer count T1a, which is a time before (in the past) the start time point of the integration period, and the sensor value Q1b detected in the timer count T1b after the start time point of the integration period, using the following Expression (3). In addition, the interpolation value Q3e at the end time point T3e of the integration period is estimated from the sensor value Q1c detected in the timer count T1c that is a time before (in the past) the end time point of the integration period and the sensor value Q1d detected in the timer count T1d that is a time after (in the past) the end time point of the integration period and before (in the past) the execution time point of the current air amount calculation process, using the following Expression (4).

$$Q_{3s}=(Q_{1b}-Q_{1a})/(T_{1b}-T_{1a})\times(T_{3s}-T_{1a})+Q_{1a} \quad \text{Expression (3)}$$

$$Q_{3e}=(Q_{1d}-Q_{1c})/(T_{1d}-T_{1c})\times(T_{3e}-T_{1c})+Q_{1c} \quad \text{Expression (4)}$$

Next, the areas S1, S2, and S3 are calculated. Since each of the areas S1, S2, and S3 is trapezoidal or rectangular, the area S1, S2, and S3 is calculated using the following Expressions (5) to (7).

$$S1=(Q_{3s}+Q_{1b})\times(T_{1b}-T_{3s})/2 \quad \text{Expression (5)}$$

$$S2=(Q_{1b}+Q_{1c})\times(T_{1c}-T_{1b})/2 \quad \text{Expression (6)}$$

$$S3=(Q_{1c}+Q_{3e})\times(T_{3e}-T_{1c})/2 \quad \text{Expression (7)}$$

Subsequently, the integrated mass Si of the intake air in the integration period is estimated by calculating the total value of the areas S1, S2, and S3. That is, Si=S1+S2+S3.

The air flow rate estimation unit 78 estimates the mass flow rate of the intake air in the current air amount calculation process from the integrated mass Si of the intake air in the integration period that is the calculation result of the integrated air mass calculation unit 77 and the execution interval $\Delta T_I$ at the current calculation time (at this time) of the air amount calculation process that is the calculation result of the air amount calculation execution interval calculation unit 75. Specifically, an estimated mass flow rate Qm of the intake air is calculated using the following Expression (8). The air flow rate estimation unit 78 delivers an estimated mass flow rate of the intake air, which is a calculation result, to the fuel injection control unit 79.

$$Qm=Si/\Delta T_I \quad \text{Expression (8)}$$

Meanwhile, in the calculation of the estimated mass flow rate Qm, when the execution interval of the air amount calculation process is treated as a predetermined value similarly to the calculation cycle of 2 ms JOB without considering the above-described fluctuation in the execution interval $\Delta T_I$ of the air amount calculation process, the estimated mass flow rate Qm fluctuates. In the calculation of the fuel injection control unit 79, since the fuel injection amount to be injected is calculated from the intake air amount and the target air-fuel ratio, when the intake air amount of the calculation result greatly deviates from the actual air amount, the fuel injection amount also deviates from an appropriate amount, so that there is a concern that exhaust performance deteriorates. In the internal combustion engine, generally, the air-fuel ratio of the exhaust gas is controlled to always approach the target value by correcting the fuel injection amount to increase when the air-fuel ratio is lean and correcting the fuel injection amount to decrease when the air-fuel ratio is rich by the air-fuel ratio feedback control. Therefore, even when the intake air amount of the calculation result of the calculation result of the air amount calculation process deviates from the actual air amount, the air-fuel ratio is controlled near the target air-fuel ratio by the feedback control from a long-term viewpoint. However, when viewed from a short-term viewpoint, the deviation of the air-fuel ratio increases, and the exhaust performance deteriorates.

Therefore, in the present embodiment, the air amount calculation execution interval calculation unit 75 of the ECU 60 calculates the execution interval (time width) $\Delta T_I$ of each time of the air amount calculation process for each calculation process. Therefore, the estimated mass flow rate Qm of the intake air calculated using the Expression (8) is calculated in consideration of the influence of the fluctuation in the execution interval $\Delta T_I$ of the air amount calculation process. Therefore, it is possible to prevent a decrease in the calculation accuracy of the estimated mass flow rate Qm due to the fluctuation in the execution interval of the air amount calculation process.

The fuel injection control unit 79 calculates a necessary fuel injection amount using the estimated air flow rate Qm calculated by the air flow rate estimation unit 78. Since the calculation process of the fuel injection amount determines the fuel injection amount to be injected according to the integrated mass of the air sucked into the combustion chamber 14, the execution interval of the calculation process is set to be relatively longer than the execution interval of the air amount calculation process described above. The calculation process of the fuel injection amount is allocated to 10 ms JOB for the air amount calculation process allocated to 2 ms JOB, for example.

The fuel injection control unit 79 further transmits a control signal corresponding to the fuel injection amount of the calculation result to the fuel injection valve 41. Specifically, since the fuel injection amount of the fuel injection valve 41 is defined by the fuel pressure and the injection period, the injection period is calculated from the fuel pressure and the fuel injection amount of the calculation result, and a pulse signal having a pulse width (duty) corresponding to the calculated injection period is transmitted to the fuel injection valve 41 as a fuel injection instruction signal. As a result, the fuel injection valve 41 is driven to open during a period corresponding to the duty of the fuel injection instruction signal, thereby injecting the fuel having the amount corresponding to the calculation result into the intake port 20*a*.

Figure 7:
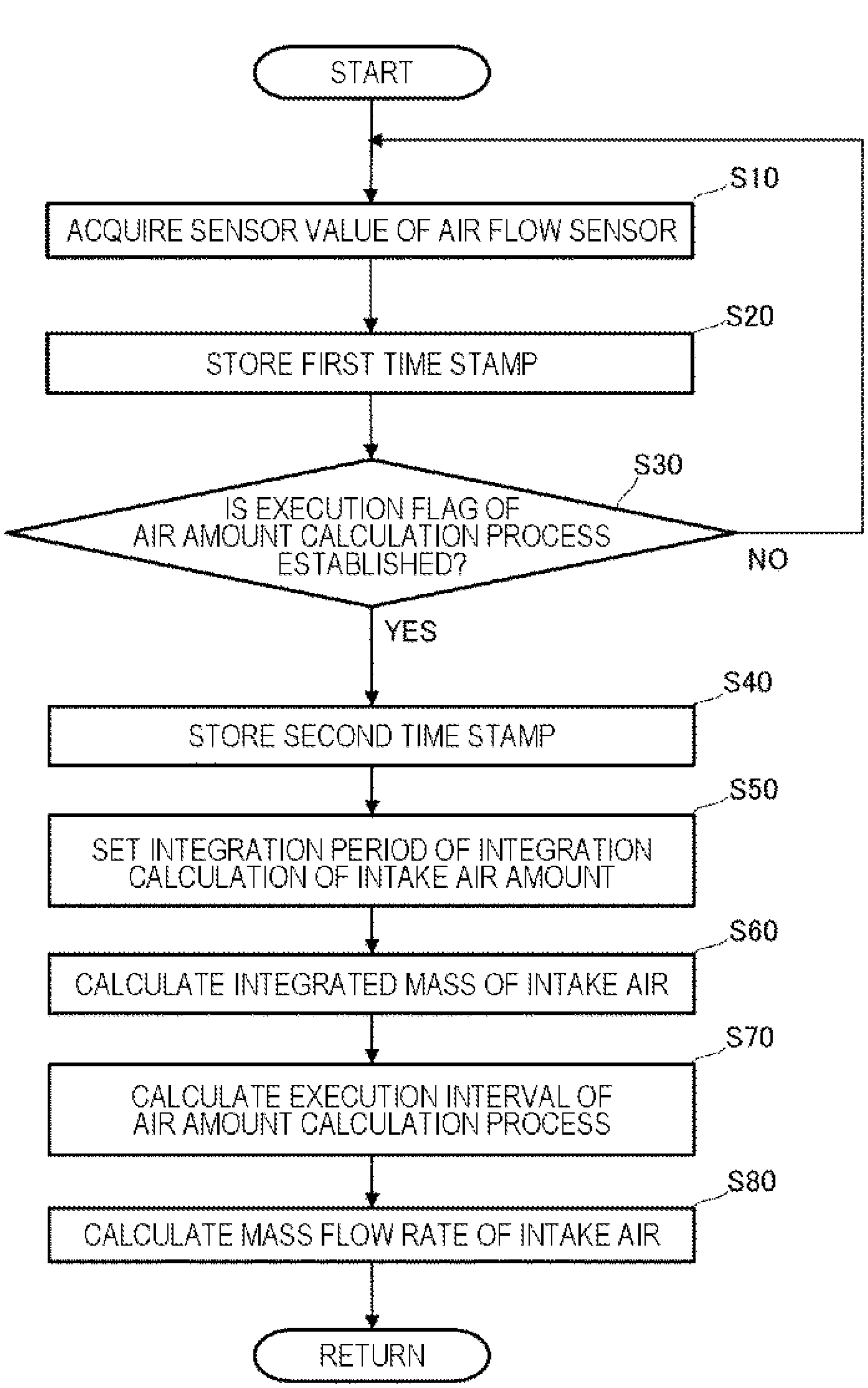
FIG. 7 is a flowchart illustrating an example of a processing procedure including the air amount calculation process in the internal combustion engine control device according to one embodiment of the present invention illustrated in FIG. 2.

Next, an example of a processing procedure of calculation of the flow rate of the intake air in the ECU according to one embodiment of the present invention will be described with reference to FIG. 7. FIG. 7 is a flowchart illustrating an example of the processing procedure including the air amount calculation process in the internal combustion engine control device according to one embodiment of the present invention illustrated in FIG. 2.

In FIG. 7, the MPU 63 (the sensor value acquisition unit 71 illustrated in FIG. 2) of the ECU 60 first receives the detection signal transmitted from the air flow sensor 51 via the SENT communication, and stores the received detection signal as a sensor value in the storage device (ROM 61 or RAM 62) (Step S10). Next, the MPU 63 (the first time stamp processing unit 72 illustrated in FIG. 2) stores a timer count indicating a time when the detection signal (sensor value) of the air flow sensor 51 is received as a first time stamp in the storage device (ROM 61 or RAM 62) in association with the received sensor value (Step S20).

Next, the MPU 63 determines whether or not the execution flag of the air amount calculation process is established (Step S30). When the execution flag is not established (NO), the processing in Steps S10 and S20 is repeated until the execution flag is established. That is, receiving the detection signal (sensor value) from the air flow sensor 51, storing the received sensor value, and storing the timer count at the time of the reception as the first time stamp are repeated. Meanwhile, when the execution flag is established (YES), the process proceeds to Step S40, and the air amount calculation process is executed.

In Step S40, the MPU 63 (the second time stamp processing unit 74 illustrated in FIG. 2) stores the timer count at the time point (time) when the execution flag of the current air amount calculation process is established as the second time stamp at the current calculation time point (current time) in the storage device (ROM 61 or RAM 62). At this time, the previous second time stamp stored in the previous air amount calculation process is also stored in the storage device (the ROM 61 or the RAM 62) while being held therein.

Subsequently, the MPU 63 (integration period setting unit 76 illustrated in FIG. 2) sets the integration period of the integration calculation of the intake air (Step S50). Specifically, a calculation result obtained by subtracting the offset amount Tx from the previous second time stamp is stored in the storage device (ROM 61 or RAM 62) as the third time stamp T3s which is the start time point of the integration period, and a calculation result obtained by subtracting the offset amount Tx from the current second time stamp is stored in the storage device (ROM 61 or RAM 62) as the third time stamp T3e which is the end time point of the integration period.

Next, the MPU 63 (integrated air mass calculation unit 77 illustrated in FIG. 2) calculates the integrated mass of the intake air in the integration period set in Step S50 (Step S60). Specifically, as described above, the flow rate of the intake air at the start time point and the end time point of the current integration period is estimated by interpolating using the sensor values of the air flow sensor 51 acquired before and after the time point. The calculation of the integrated mass of the intake air in the integration period is the same value as the calculation of the area surrounded by the sensor value and the estimation value by interpolation in the integration period illustrated in FIG. 6. That is, the area S1, the area S2, and the area S3 are calculated using the above-described Expressions (5), (6), and (7), respectively, and the integrated mass Si of the intake air in the integration period is calculated from the total value of the areas S1, S2, and S3.

Next, the MPU 63 (the air amount calculation execution interval calculation unit 75 illustrated in FIG. 2) calculates an execution interval (time width) of the current air amount calculation process (Step S70). Since the air amount calculation process does not always have a constant cycle (execution interval) as described above, an accurate execution interval (time width) is calculated every time the air amount calculation process is executed. Specifically, the previous second time stamp and the current second time stamp stored in the storage device (ROM 61 or RAM 62) in Step S20 are called, and a difference obtained by subtracting the previous second time stamp from the current second time stamp is calculated as the execution interval $\Delta T_I$ of the current air amount calculation process.

Finally, the MPU 63 (air flow rate estimation unit 78 illustrated in FIG. 2) calculates the mass flow rate of the intake air in the current air amount calculation process using the calculation result of Step S60 and the calculation result of Step S70 (Step S80). Specifically, the estimated mass flow rate Qm is calculated by dividing the integrated mass of the intake air as the calculation result of Step S60 by the execution interval $\Delta T_I$ of the current air amount calculation process as the calculation result of Step S70. The estimated mass flow rate Qm calculated in the air amount calculation process is information used for the calculation of the fuel injection amount in the fuel injection control unit 79 described above.

As described above, in the present embodiment, when the estimated mass flow rate Qm is calculated, the execution interval 41 the current air amount calculation process calculated based on the timer count at the time when the execution flag is established is used. As a result, the accuracy of the estimated value of the estimated mass flow rate Qm can be improved as compared with a case where the estimated mass flow rate Qm is calculated by using the estimated mass flow rate Qm as a fixed value without paying attention to the fluctuation in the execution interval of the air amount calculation process. Therefore, the calculation accuracy of the fuel injection amount in the fuel injection control unit 79 can be increased accordingly.

As described above, the ECU 60 (internal combustion engine control device) according to one embodiment of the present invention includes the MPU 63 (processing device) that repeatedly executes the air amount calculation process of estimating the flow rate of the intake air based on the detection value of the air flow sensor 51 (flow rate sensor) that detects the flow rate of the intake air of the engine 1 (internal combustion engine) at time intervals, and the storage device (ROM 61 or RAM 62) that stores information necessary for the air amount calculation process of the MPU 63 (processing device). The MPU 63 (processing device) is configured to acquire the detection value of the air flow sensor 51 (flow rate sensor) at a predetermined acquisition cycle shorter than the execution interval of the air amount calculation process and store the detection value in the storage device (the ROM 61 or the RAM 62), store the time when the detection value of the air flow sensor 51 (flow rate sensor) is acquired in the storage device (ROM 61 or RAM 62) in association with the detection value of the air flow sensor 51 (flow rate sensor) as the first time stamp T1, and store the time when the air amount calculation process is executed each time in the storage device (ROM 61 or RAM 62) as the second time stamp T2. In each time of the air amount calculation process of the MPU 63 (processing device), the execution interval calculation for calculating the execution interval $\Delta T_I$ of the calculation process at the present time is performed based on the second time stamp T2 stored in the storage device (ROM 61 or RAM 62), the integration period having the same time width as the execution interval of the calculation process at the current time point is set based on the second time stamp T2 stored in the storage device (ROM 61 or RAM 62), the integration calculation for calculating the integrated mass of the intake air in the set integration period is performed based on the detection value of the air flow sensor 51 (flow rate sensor) stored in the storage device (ROM 61 or RAM 62) and the first time stamp T1 corresponding thereto, and the estimation flow rate calculation for estimating the flow rate of the intake air in the set integration period is performed based on the calculation result of the integration calculation and the calculation result of the execution interval.

According to this configuration, the MPU 63 (processing device) calculates the execution interval $\Delta T_I$ of each time of the air amount calculation process based on the second time stamp T2 stored in the storage device (ROM 61 or RAM 62), and estimates the flow rate Qm of the intake air using the execution interval $\Delta T_I$ of the calculation result. Therefore, even when the execution interval $\Delta T_I$ of the air amount calculation process fluctuates instead of a constant period, the influence of the fluctuation of the execution interval $\Delta T_I$ of the air amount calculation process with respect to the estimated mass flow rate Qm of the calculation result can be eliminated. That is, even when the execution interval $\Delta T_I$ of the air amount calculation process of the MPU 63 (processing device) fluctuates, the intake air amount can be estimated with high accuracy.

In addition, in the present embodiment, the execution interval calculation of the MPU 63 (processing device) subtracts the previous second time stamp $T2_{p-1}$ corresponding to the time of the execution time point of the calculation process one time before the calculation process at the current time point from the current second time stamp T2p corresponding to the time of the time of execution of the calculation process at the current time point. In the estimation flow rate calculation of the MPU 63 (processing device), the integrated mass of the intake air which is the calculation result of the integration calculation is divided by the difference of the second time stamp which is the calculation result of the execution interval calculation.

According to this configuration, since the execution interval of each time of the air amount calculation process is calculated using the difference of the second time stamp indicating the time at the time of execution of each time of the air amount calculation process, the execution interval of each time of the air amount calculation process can be accurately and easily calculated.

Other Embodiments

Note that the present invention is not limited to the present embodiment, and includes various modifications. The above-described embodiments have been described in detail for easy understanding of the present invention, and are not necessarily limited to those having all the described configurations. A part of the configuration of one embodiment can be replaced with the configuration of another embodiment, and the configuration of another embodiment can be added to the configuration of one embodiment. In addition, it is also possible to add, delete, and replace other configurations for a part of the configuration of each embodiment.

For example, in the above-described embodiment, an example has been described in which the ECU 60 executes each step of the air amount calculation process by executing software. However, it is also possible to implement a configuration by mounting hardware such as a circuit device having a function equivalent to the execution of the software.

In addition, in the above-described embodiment, the example has been described in which the air amount calculation execution interval calculation unit 75 calculates the difference obtained by subtracting the previous second time stamp $T2_{p-1}$ from the current second time stamp T2p which stores the execution interval $\Delta T_I$ of each time of the air amount calculation process in the storage device. However, it is also possible to calculate the execution interval $\Delta T_I$ of each time of the air amount calculation process of the air amount calculation execution interval calculation unit 75 using the difference (T3e−T3s) between the third time stamp T3e at the end time point of the integration period and the third time stamp T3s at the start time point.

In this modification, in each time of the air amount calculation process of the MPU 63 (processing device), the time at the start time point and the time at the end time point in the set integration period are stored in the storage device (ROM 61 or RAM 62) as the third time stamps T3s and T3e, respectively. In the execution interval calculation of the MPU 63 (processing device), the third time stamp T3s corresponding to the start time point is subtracted from the third time stamp T3e corresponding to the end time point of the set integration period. Further, in the estimation flow rate calculation of the MPU 63 (processing device), the integrated mass Si of the intake air which is the calculation result of the integration calculation is divided by the difference between the third time stamps T3s and T3e which are the calculation results of the execution interval calculation.

According to this configuration, since the execution interval $\Delta T_I$ of each time of the air amount calculation process is calculated using the difference between the third time stamps T3s and T3e corresponding to the start time point and the end time point in the integration period, the influence of the fluctuation in the execution interval of the air amount calculation process on the calculation result of the flow rate of the intake air in the integration period is inevitably eliminated.

REFERENCE SIGNS LIST

1 engine (internal combustion engine)
51 air flow sensor (flow rate sensor)
60 ECU (internal combustion engine control device)
61 ROM (storage device)
62 RAM (storage device)
63 MPU (processing device)
71 sensor value acquisition unit
72 first time stamp processing unit
74 second time stamp processing unit
75 execution interval calculation unit (execution interval calculation)
76 integration period setting unit
77 integrated air mass calculation unit (integration calculation)
78 air flow rate estimation unit (estimation flow rate calculation)

The invention claimed is:

1. An internal combustion engine control device, comprising:

a processing device that repeatedly executes an air amount calculation process of estimating a flow rate of intake air based on a detection value of a flow rate sensor that detects the flow rate of the intake air of an internal combustion engine at time intervals; and a storage device that stores information necessary for the air amount calculation process of the processing device, wherein the processing device is configured to acquire the detection value of the flow rate sensor at a predetermined acquisition cycle shorter than an execution interval of the air amount calculation process and store the detection value in the storage device, store a time when the detection value of the flow rate sensor is acquired in the storage device as a first time stamp in association with the detection value of the flow rate sensor, and store a time at which the air amount calculation process is executed each time in the storage device as respective second time stamps, and in each time of the air amount calculation process of the processing device, an execution interval calculation of calculating an execution interval of a calculation process at a current time point is performed based on the second time stamp stored in the storage device, an integration period having a same time width as the execution interval of the calculation process at the current time point is set based on the second time stamp stored in the storage device, an integration calculation of calculating an integrated mass of the intake air in the set integration period is performed based on the detection value of the flow rate sensor stored in the storage device and the first time stamp corresponding to the detection value, and an estimation flow rate calculation of estimating the flow rate of the intake air in the set integration period is performed based on the calculation result of the integration calculation and the calculation result of the execution interval calculation.

2. The internal combustion engine control device according to claim 1, wherein the execution interval calculation of the processing device is to subtract a previous one of the second time stamps corresponding to a time of an execution time point of a calculation process one time before the calculation process at the current time point from a current one of the second time stamps corresponding to a time of an execution time point of the calculation process at the current time point, and the estimation flow rate calculation of the processing device is to divide the integrated mass of the intake air that is the calculation result of the integration calculation by a difference between the current one of the second time stamps and the previous one of the second time stamps that is the calculation result of the execution interval calculation.

3. The internal combustion engine control device according to claim 1, wherein each time of the air amount calculation process of the processing device further stores times at a start time point and at an end time point in the set integration period in the storage device as third time stamps, the execution interval calculation of the processing device is to subtract one of the third time stamps corresponding to the start time point from another one of the third time stamps corresponding to the end time point of the set integration period, and the estimation flow rate calculation of the processing device is to divide the integrated mass of the intake air that is the calculation result of the integration calculation by a difference between the third time stamps, the difference being the calculation result of the execution interval calculation.

* * * * *